E. VAN BRABANT.
MACHINE FOR REMOVING THE FLAX SEED FROM THE FLAX.
APPLICATION FILED APR. 11, 1917.

1,287,525. Patented Dec. 10, 1918.

Inventor
E. Van Brabant

UNITED STATES PATENT OFFICE.

EDOUARD VAN BRABANT, OF MAIDA VALE, LONDON, ENGLAND.

MACHINE FOR REMOVING THE FLAX-SEED FROM THE FLAX.

1,287,525.  Specification of Letters Patent.  Patented Dec. 10, 1918.

Application filed April 11, 1917. Serial No. 161,365.

*To all whom it may concern:*

Be it known that I, EDOUARD VAN BRABANT, a citizen of the Republic of France, and resident of Maida Vale, in the county of London, Kingdom of England, have invented a certain new and useful Machine for Removing the Flax-Seed from the Flax, of which the following is a specification.

This invention relates to an improved machine particularly adapted for use in removing or extracting the seed from flax.

The invention has for its object to provide a machine of simple and inexpensive construction which is manually operated and whereby the seed can be easily, quickly and effectively separated from the fibers, stems or stalks of the flax.

A suitable construction of the machine will now be described with reference to the accompanying drawing, in which:—

Figure 1:
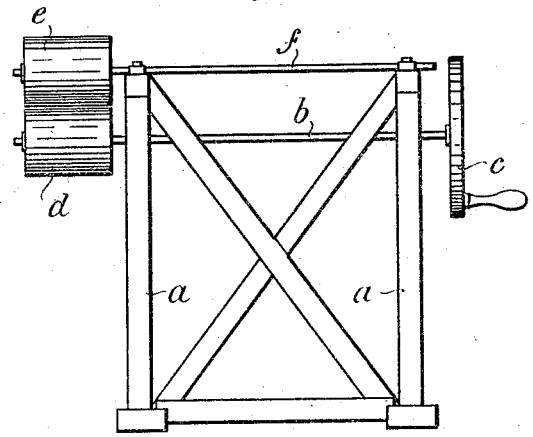
Figure 1 is a front elevation of the machine.
Figure 2:
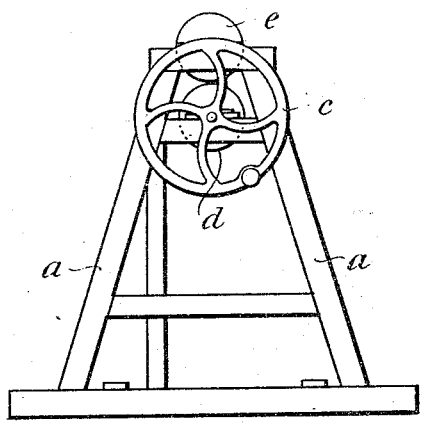
Fig. 2 represents an end elevation of the same.

The machine illustrated comprises a wooden or other stand $a$ upon which is rotatably mounted in suitable bearings a shaft $b$ having a hand wheel or fly wheel $c$ secured to one of its ends and a roller or drum $d$ fixed on its other end. Disposed above the roller or drum $d$ is a second and freely mounted roller or drum $e$ carried on one end of a second shaft $f$ which is mounted on the stand. The roller $e$ may be loosely mounted on the shaft $f$ and the latter be fixed on the stand, or said shaft may be rotatably mounted and the said roller be fixed thereon. One or both of the shafts may be vertically adjustable in relation to the stand.

To separate or extract the seed from the flax the latter is passed or drawn through between the rollers or drums and the latter arrest the passage of said seed and the husks and strip the same from the fibers, stems or stalks. The roller or drum $d$ can be driven by turning the hand wheel $c$ while the lower ends of the stems or stalks of the flax are worked between the two rollers or drums and pulled through them, thus causing the roller $e$ to also rotate, the weight of the wheel assisting the action of the rollers or drums as the flax passes between them.

What I claim is:—

A machine for separating seed from flax, comprising a frame, a manually operable plain roller projecting beyond the frame and secured on a shaft, and a second loosely mounted plain roller mounted on the frame and projecting beyond the latter and disposed over the manually operated roller, the outer ends of the rollers being unsupported and entrance to the gap at the free ends of the rollers being unobstructed so that the flax can be inserted and drawn through the rollers by hand, the seed and husks being arrested from passing between the rollers by the action of the latter and thereby stripped from the stalks.

In testimony whereof I have hereunto signed my name.

EDOUARD VAN BRABANT.

Copies of this patent may be obtained for five cents each, by addressing the "Commissioner of Patents, Washington, D. C."